(12) United States Patent
Gadd

(10) Patent No.: US 9,387,554 B2
(45) Date of Patent: Jul. 12, 2016

(54) LASER PROCESSING APPARATUS

(71) Applicant: Disco Corporation, Tokyo (JP)

(72) Inventor: Michael Gadd, Tokyo (JP)

(73) Assignee: Disco Corporation, Tokyo (JP)

( * ) Notice: Subject to any disclaimer, the term of this patent is extended or adjusted under 35 U.S.C. 154(b) by 215 days.

(21) Appl. No.: 13/961,028

(22) Filed: Aug. 7, 2013

(65) Prior Publication Data

US 2014/0048519 A1   Feb. 20, 2014

(30) Foreign Application Priority Data

Aug. 17, 2012   (JP) .................................. 2012-180761

(51) Int. Cl.
*B23K 26/00*   (2014.01)
*B23K 26/16*   (2006.01)
*B23K 26/36*   (2014.01)

(52) U.S. Cl.
CPC ............... *B23K 26/16* (2013.01); *B23K 26/142* (2015.10); *B23K 26/364* (2015.10); *B23K 26/367* (2013.01)

(58) Field of Classification Search
CPC ... B23K 26/1405; B23K 26/16; B23K 26/367
USPC ............. 219/121.84, 121.82, 121.68, 121.67, 219/121.72, 121.65
See application file for complete search history.

(56) References Cited

U.S. PATENT DOCUMENTS

2004/0226927 A1* 11/2004 Morikazu et al. ........ 219/121.84
2007/0145026 A1*  6/2007 Murase et al. ........... 219/121.84

FOREIGN PATENT DOCUMENTS

| JP | 62-251077 A | 10/1987 |
| JP | 2006-032419 | 2/2006 |
| JP | 2007-069249 | 3/2007 |
| JP | 2011-121099 | 6/2011 |
| JP | 2011-189400 | 9/2011 |
| JP | 2011-249393 A | 12/2011 |

* cited by examiner

*Primary Examiner* — Phuong Nguyen
(74) *Attorney, Agent, or Firm* — Greer Burns & Crain Ltd.

(57) ABSTRACT

A laser processing apparatus including a processing head for applying a laser beam to a workpiece. The processing head includes a focusing lens and a collecting unit provided between the focusing lens and the workpiece for collecting debris generated by the application of the laser beam focused by the focusing lens to the workpiece. The collecting unit includes a suction source for sucking the debris and a suction line having one end connected to the suction source and the other end opening to the front side of the workpiece. The laser processing apparatus further includes a cleaning liquid supplying unit for supplying a cleaning liquid to the suction line.

1 Claim, 5 Drawing Sheets

LASER PROCESSING APPARATUS

BACKGROUND OF THE INVENTION

1. Field of the Invention

The present invention relates to a laser processing apparatus for applying a laser beam to the front side of a workpiece such as a wafer to thereby perform ablation.

2. Description of the Related Art

A plurality of semiconductor devices such as ICs (Integrated Circuits) and LSIs (Large Scale Integrated Circuits) are formed on the front side of a semiconductor wafer or a plurality of optical devices such as LEDs (Light Emitting Diodes) are formed on the front side of an optical device wafer. Such a wafer including the semiconductor wafer and the optical device wafer has a plurality of crossing division lines (streets) for partitioning the devices. A laser beam is applied to the front side of the wafer along the division lines by using a laser processing apparatus to thereby form a plurality of laser processed grooves on the front side of the wafer along the division lines. An external force is applied to the wafer thus having the laser processed grooves along the division lines, thereby dividing the wafer into the individual devices. These individual devices are installed in various electronic equipment such as PCs (Personal Computers) and LED lights, thus manufacturing the electronic equipment having the devices.

It is known that when a laser beam having an absorption wavelength to the wafer is applied to the wafer in this laser processing step, fine dust particles called debris are generated and scattered to stick to the front side of each device, causing a deterioration in device quality. To cope with this problem, there has been proposed a processing method including the steps of forming a protective film on the wafer before laser processing and cleaning off the protective film and the debris deposited on the protective film after laser processing. There has also been proposed a laser processing apparatus including a nozzle for blowing air along the optical axis of a focusing objective lens and collecting means for sucking the debris from the periphery of the nozzle (see Japanese Patent Laid-open Nos. 2007-69249 and 2011-189400, for example).

SUMMARY OF THE INVENTION

However, the protective film itself is evaporated by the laser beam in actually performing the laser processing, and the debris due to the protective film is deposited to a mechanism for sucking the debris. In this case, the debris deposited must be removed to prevent the drop of the debris onto the wafer, causing the need for frequent maintenance. Furthermore, the air blown along the optical axis of the focusing objective lens does not sufficiently function, causing the deposition of the debris to the focusing objective lens and other optical components.

In continuously processing the wafer, the debris containing the scattered matter from the protective film may be deposited to a suction line of the collecting means and finally fixed like an ice pillar. Once the debris is fixed to the suction line, it is difficult to clean off the debris. Further, the debris fixed to the suction line causes a reduction in suction force in the suction line. As a result, the debris generated in performing the laser processing to the wafer cannot be sufficiently collected.

It is therefore an object of the present invention to provide a laser processing apparatus which can suppress the deposition of the debris generated during the laser processing to the optical components including focusing means and to the suction line.

It is another object of the present invention to provide a laser processing apparatus which can clean the suction line even when a part of the debris sticks to the suction line, thereby preventing the fixation of the debris to the suction line.

In accordance with an aspect of the present invention, there is provided a laser processing apparatus including holding means for holding a workpiece; and laser beam applying means for performing ablation to the workpiece held by the holding means, the laser beam applying means including laser beam oscillating means for oscillating a laser beam and a processing head for applying the laser beam oscillated by the laser beam oscillating means to the workpiece; the processing head including a focusing lens for focusing the laser beam oscillated by the laser beam oscillating means and collecting means provided between the focusing lens and the workpiece for collecting debris generated by the application of the laser beam focused by the focusing lens to the workpiece; the collecting means including a suction source for sucking the debris and a suction line having one end connected to the suction source and the other end opening to the front side of the workpiece; the laser processing apparatus further including cleaning liquid supplying means for supplying a cleaning liquid to the suction line.

Preferably, the cleaning liquid supplying means includes a cleaning liquid nozzle opening to the suction line, a cleaning liquid source for supplying the cleaning liquid to the cleaning liquid nozzle, and a cleaning liquid supply line having one end connected to the cleaning liquid nozzle and the other end connected to the cleaning liquid source.

Preferably, the cleaning liquid supplying means includes a cleaning liquid reservoir for storing the cleaning liquid, the suction line being cleaned by immersing the processing head into the cleaning liquid reservoir with predetermined timing and operating the suction source in the condition where the processing head is immersed in the cleaning liquid reservoir.

In accordance with another aspect of the present invention, there is provided a cleaning method for the suction line in the laser processing apparatus according to the present invention, including a processing step of performing ablation to the workpiece; a retracting step of retracting the processing head from the workpiece after performing the processing step; and a cleaning step of operating the cleaning liquid supplying means to clean the suction line after performing the retracting step.

In the laser processing apparatus of the present invention, it is possible to suppress the deposition of the debris generated during the laser processing to the optical components including the focusing means and to the suction line. Even when a part of the debris sticks to the suction line, the suction line can be cleaned by the cleaning liquid supplied from the cleaning liquid supplying means, thereby preventing the fixation of the debris to the suction line.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
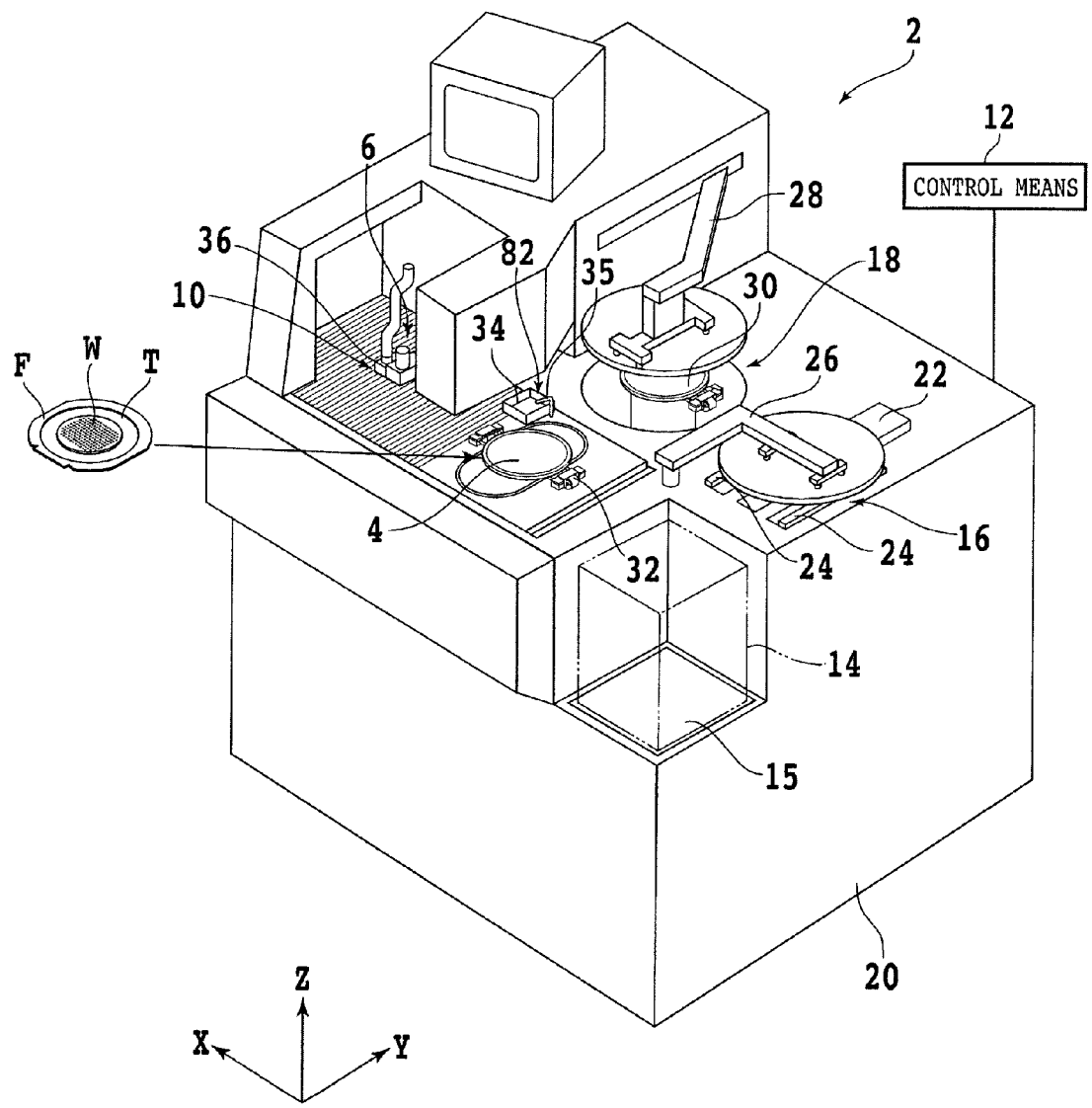
FIG. 1 is a perspective view of a laser processing apparatus according to a first preferred embodiment of the present invention.

Preferred embodiments of the present invention will now be described in detail with reference to the drawings. FIG. 1 is a perspective view of a laser processing apparatus 2 according to a first preferred embodiment of the present invention. The laser processing apparatus 2 shown in FIG. 1 is so configured as to form a protective film P (see FIG. 4) on a wafer W (corresponding to a workpiece), hold the wafer W on a chuck table 4 (corresponding to holding means), apply a laser beam from laser beam applying means 6 to the wafer W held on the chuck table 4, and relatively move the chuck table 4 and the laser beam applying means 6 to thereby perform ablation (laser processing) to the wafer W so that a processed groove S (see FIG. 4) is formed on the wafer W by the laser beam.

The laser processing apparatus 2 includes the chuck table 4 for holding the wafer W, a processing head 36 constituting the laser beam applying means 6, imaging means (not shown), debris discharging means 10 provided on the processing head 36, and control means 12. The laser processing apparatus 2 further includes a cassette 14 for storing the wafer W before and after laser processing, temporary placing means 16 for temporarily placing the wafer W before and after laser processing, and protective film forming and cleaning means 18 for forming the protective film P on the wafer W before laser processing and removing the protective film P from the wafer W after laser processing.

The laser processing apparatus 2 further includes X-axis moving means (not shown) for relatively moving the chuck table 4 and the laser beam applying means 6 in the X direction, Y-axis moving means (not shown) for relatively moving the chuck table 4 and the laser beam applying means 6 in the Y direction, and Z-axis moving means (not shown) for relatively moving the chuck table 4 and the laser beam applying means 6 in the Z direction.

The cassette 14 is so configured as to store a plurality of wafers W, each wafer W being supported through an adhesive tape T to an annular frame F. That is, each wafer W is attached to the adhesive tape T preliminarily supported to the annular frame F. The laser processing apparatus 2 has a body housing 20 and a cassette elevator 15 provided in the body housing 20 so as to be vertically movable in the Z direction. The cassette 14 is placed on the cassette elevator 15. The temporary placing means 16 includes handling means 22 for taking the wafer W before laser processing out of the cassette 14 and also inserting the wafer W after laser processing into the cassette 14 and a pair of rails 24 for temporarily placing thereon the wafer W before and after laser processing.

The protective film forming and cleaning means 18 functions to form the protective film P on the wafer W before laser processing. The wafer W before laser processing is placed on the pair of rails 24 and next transferred to the protective film forming and cleaning means 18 by first transfer means 26. The protective film forming and cleaning means 18 also functions to clean the protective film P off the wafer W after laser processing. The wafer W after laser processing is placed on the chuck table 4 and next transferred to the protective film forming and cleaning means 18 by second transfer means 28. The protective film forming and cleaning means 18 has a spinner table 30 for placing and holding the wafer W before and after laser processing. The spinner table 30 is connected to a spinner table drive source (not shown) provided in the body housing 20 of the laser processing apparatus 2.

In the case of forming the protective film P, the wafer W before laser processing is held on the spinner table 30, and the spinner table 30 is rotated by the spinner table drive source to thereby rotate the wafer W. In this rotational condition, a liquid resin including a water-soluble resin such as PVA, PEG, and PEO is sprayed from a coating nozzle (not shown) constituting the protective film forming and cleaning means 18 onto the front side WS of the wafer W being rotated. Thus, the liquid resin is applied to the front side WS of the wafer W. When the liquid resin is cured, the protective film P is formed on the front side WS of the wafer W.

In the case of cleaning off the protective film P, the wafer W after laser processing is held on the spinner table 30 and the spinner table 30 is rotated by the spinner table drive source to thereby rotate the wafer W. In this rotational condition, a cleaning liquid is sprayed from a cleaning nozzle (not shown) constituting the protective film forming and cleaning means 18 onto the front side WS of the wafer W being rotated. Thus, the protective film P is removed and the front side WS of the wafer W is cleaned.

After the protective film P is formed on the wafer W before laser processing by the protective film forming and cleaning means 18, the wafer W is transferred to the chuck table 4 by the second transfer means 28. Further, after the protective film P is removed from the wafer W after laser processing by the protective film forming and cleaning means 18, the wafer W is transferred to the rails 24 of the temporary placing means 16 by the first transfer means 26.

The chuck table 4 functions to hold the wafer W transferred from the spinner table 30 of the protective film forming and cleaning means 18 after forming the protective film P on the wafer W. The chuck table 4 has a circular upper surface as a holding surface formed of a porous ceramic or the like. This holding surface of the chuck table 4 is connected through a vacuum line (not shown) to a vacuum source (not shown), thereby holding the wafer W placed thereon under suction.

The chuck table 4 is detachably supported to a table moving base (not shown) provided in the body housing 20 of the laser processing apparatus 2. This table moving base is movable in the X direction by the X-axis moving means and also movable in the Y direction by the Y-axis moving means. This table moving base is also rotatable about its axis (parallel to the Z axis) by a base drive source (not shown). Further, a clamp 32 for fixing the annular frame F is provided in the periphery of the chuck table 4. The clamp 32 is operated by an air actuator (not shown) to thereby fix the annular frame F supporting the wafer W through the adhesive tape T.

The laser processing apparatus 2 according to the first preferred embodiment shown in FIG. 1 includes cleaning liquid supplying means 82 provided adjacent to the chuck table 4. The cleaning liquid supplying means 82 includes a cleaning liquid reservoir 34 and a cleaning liquid supply nozzle 35 for supplying a cleaning liquid to the cleaning liquid reservoir 34. This cleaning liquid is stored in the cleaning liquid reservoir 34 and used to clean the processing head 36.

Figure 2:
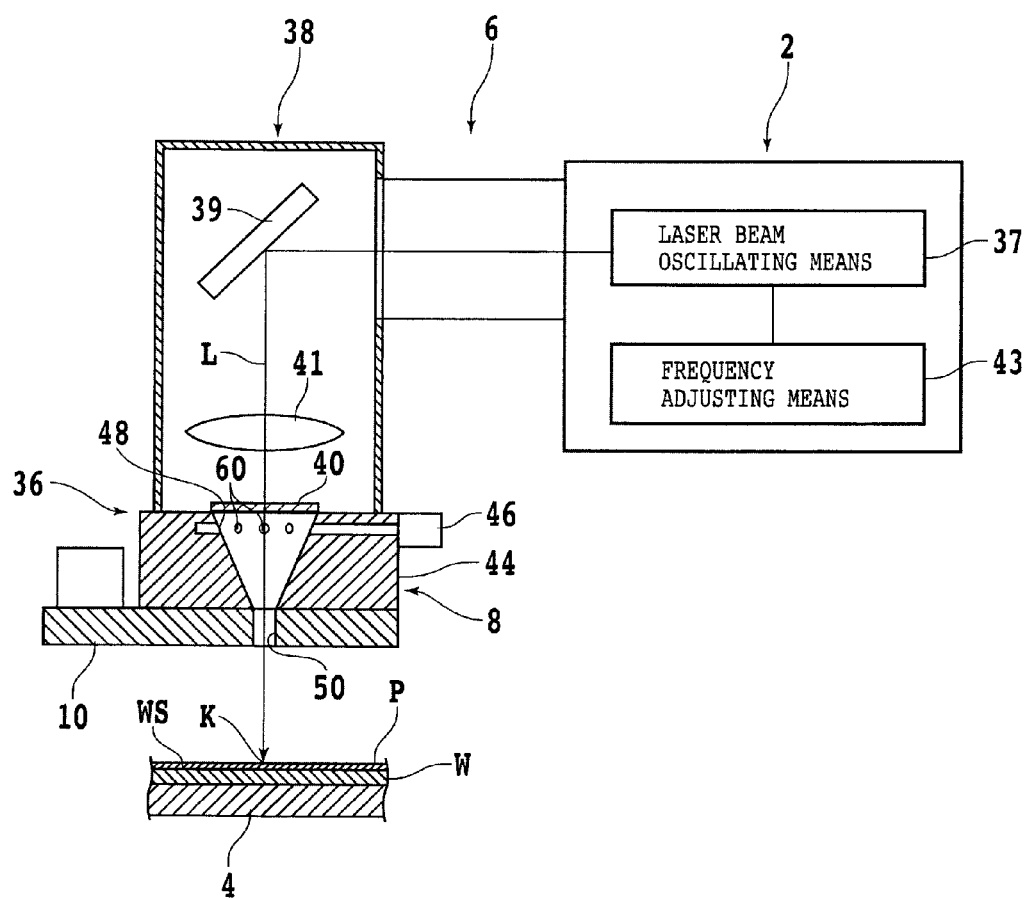
FIG. 2 is a schematic view showing the configuration of laser beam applying means and a chuck table included in the laser processing apparatus.

The laser beam applying means 6 functions to apply a laser beam L (see FIG. 2) to the front side WS of the wafer W held on the chuck table 4 to thereby form the processed groove S by ablation. FIG. 2 is a schematic view showing the configuration of the laser beam applying means 6 and the chuck table 4. The laser beam applying means 6 includes the processing head 36 and laser beam oscillating means 37 for oscillating the laser beam L.

The processing head 36 includes focusing means 38 for applying the laser beam L oscillated by the laser beam oscillating means 37 to the front side WS of the wafer W and collecting means 70 (see FIG. 3) for collecting the debris to be hereinafter described. The laser beam applying means 6 further includes repetition frequency adjusting means 43 for suitably adjusting the repetition frequency of the laser beam L to be oscillated by the laser beam oscillating means 37 according to the kind of the wafer W, the form of processing, etc. For example, a YAG laser oscillator and a YVO4 laser oscillator may be used as the laser beam oscillating means 37. The focusing means 38 included in the processing means 36 includes a total-reflection mirror 39 for changing the traveling direction of the laser beam L oscillated by the laser beam oscillating means 37 and a focusing lens 41 for focusing the laser beam L reflected by the total-reflection mirror 39.

The imaging means (not shown) functions to image the front side WS of the wafer W held on the chuck table 4. The imaging means is movable in the Z direction integrally with the laser beam applying means 6 by the Z-axis moving means. The imaging means includes a CCD camera (not shown) for imaging the wafer W held on the chuck table 4 to obtain an image. The image obtained by the CCD camera is output from the imaging means to the control means 12.

Figure 3:
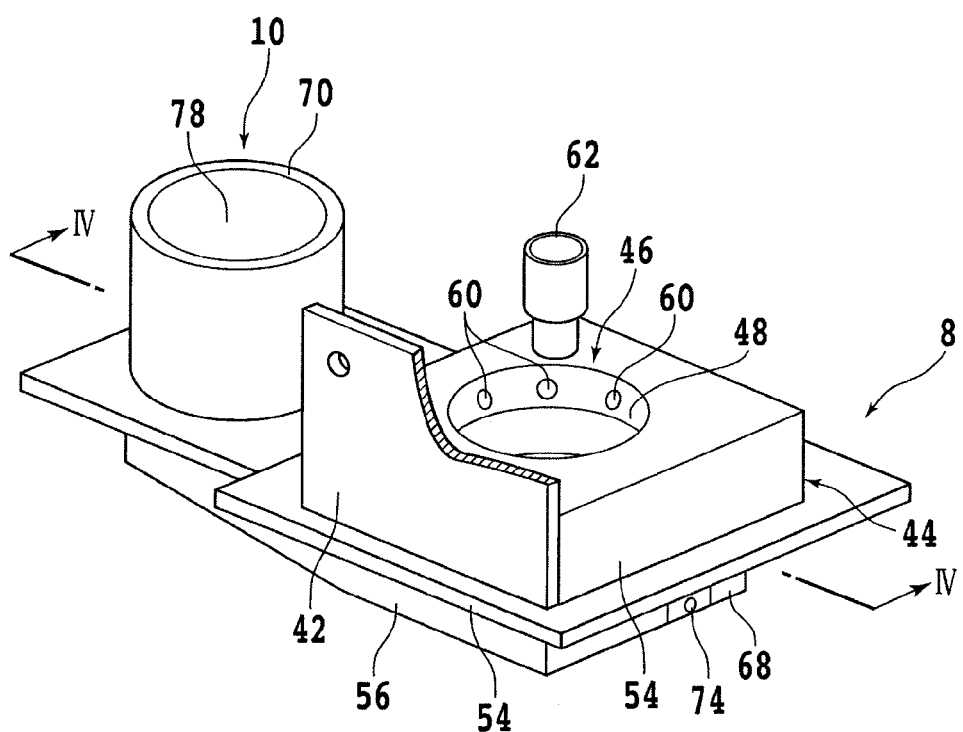
FIG. 3 is a perspective view showing the configuration of protection blow means included in the laser processing apparatus.
Figure 4:
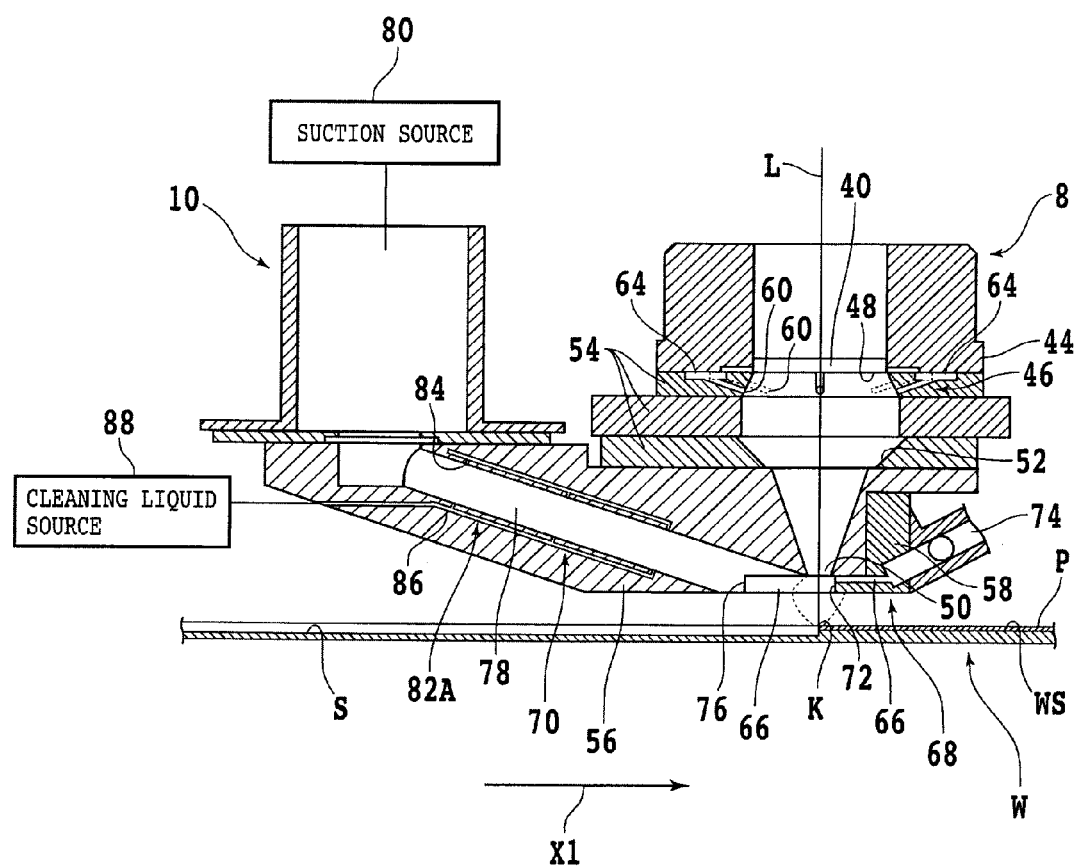
FIG. 4 is a cross section taken along the line IV-IV in FIG. 3, showing a second preferred embodiment of the present invention.

FIG. 3 is a perspective view showing the configuration of protection blow means 8 included in the laser processing apparatus 2, and FIG. 4 is a cross section taken along the line IV-IV in FIG. 3, showing a second preferred embodiment of the present invention. The protection blow means 8 includes a housing 44 mounted through a bracket 42 (see FIG. 3) to the focusing means 38 of the laser beam applying means 6, a transparent member 40 mounted on the housing 44, and a protection blow mechanism 46 for keeping a positive pressure in the housing 44. The housing 44 has an upper opening 48 and a lower opening 50 for allowing the pass of the laser beam L. The housing 44 has a funnel-shaped conical portion 52 gradually reduced in diameter toward the lower opening 50. That is, the conical portion 52 of the housing 44 defines a funnel-shaped conical inside space.

The lower opening 50 of the housing 44 has an area allowing the pass of the laser beam L. For example, the diameter of the lower opening 50 is set to 4 mm. The housing 44 is composed of a plurality of stacked flat plates 54 and a lowermost elongated plate 56. The transparent member 40 is provided so as to close the upper opening 48 of the housing 44 and can transmit the laser beam L. The transparent member 40 has an area allowing the pass of the laser beam L. That is, the transparent member 40 is formed of a material capable of transmitting the laser beam L, and it is a circular flat plate having a size capable of closing the upper opening 48 of the housing 44.

The protection blow mechanism 46 functions to blow a gas flowing from the focusing means 38 side to a work point K side around the laser beam L passing through the housing 44, thereby keeping a positive pressure in the housing 44 to prevent that an atmosphere containing the debris may flow from the lower opening 50 into the housing 44. As shown in FIGS. 3 and 4, the protection blow mechanism 46 includes a plurality of blow ports 60, a gas supply line 62 (see FIG. 3), and a gas source (not shown). The plural blow ports 60 are arranged around the transparent member 40 so as to be equally spaced from each other in the circumferential direction of the transparent member 40. Each blow port 60 has one end opening to the inner surface of the housing 44 and the other end opening to a communication space 64 formed in the housing 44.

The gas to be blown from the blow ports 60 is directed toward the laser beam L passing through the housing 44 so as to be inclined slightly downward from a horizontal plane to such an extent that the gas does not strike the transparent member 40. That is, one end of each blow port 60 opening to the inner surface of the housing 44 is located below the transparent member 40, and each blow port 60 extends slightly obliquely downward from the other end to one end thereof. For example, eight blow ports 60 are provided. The gas supply line 62 shown in FIG. 3 is connected through the communication space 64 to the plural blow ports 60. The gas source is connected through the gas supply line 62 to the plural blow ports 60, thereby supplying a pressurized gas to the plural blow ports 60.

The debris discharging means 10 is provided below the housing 44 of the protection blow means 8 to discharge the debris under suction. As shown in FIGS. 3 and 4, the debris discharging means 10 includes a partition wall 66 (see FIG. 4) integral with the housing 44, an air curtain blow mechanism 68, and collecting means 70. The partition wall 66 is so formed as to surround a scatter area (shown by a dotted line in FIG. 4) of the debris generated at the work point K. The partition wall 66 is formed on the lowermost elongated plate 56 constituting the housing 44. The partition wall 66 is so formed as to surround the lower opening 50 of the housing 44.

The air curtain blow mechanism 68 functions to blow a gas in a direction parallel to the front side WS of the wafer W in opposition to the direction of forming the processed groove S (from the downstream side in the direction shown by an arrow X1 in FIG. 4, which is the direction of relatively moving the laser beam L on the front side WS of the wafer W during laser processing), thereby covering the lower opening 50 of the housing 44 with this gas to prevent the entry of the debris into the housing 44. The air curtain blow mechanism 68 includes a nozzle member 58 mounted on the elongated plate 56, a blow port 72 formed in the nozzle member 58, a gas supply line 74 connected to the blow port 72, and a gas source (not shown) for supplying the gas through the gas supply line 74 to the blow port 72.

The blow port 72 is so formed as to open to the inner surface (inside) of the partition wall 66 formed on the nozzle member 58 in the vicinity of the lower opening 50 of the housing 44. The blow port 72 extends parallel to the front side WS of the wafer W. The gas source is connected through the gas supply line 74 formed in the housing 44 to the blow port 72, thereby supplying a pressurized gas to the blow port 72. Thus, the pressurized gas (air blow) is blown from the blow port 72.

The collecting means 70 is provided downstream of the flow of the gas blown by the air curtain blow mechanism 68 and functions to suck the gas and the debris generated near the work point K. As shown in FIG. 4, the collecting means 70 includes a suction port 76 opening to the partition wall 66, a suction line 78 communicating with the suction port 76, and a suction source 80 communicating with the suction line 78. The suction port 76 is provided below the housing 44 of the protection blow means 8 so as to open to the inner surface (inside) of the partition wall 66 formed on the lowermost elongated plate 56 of the housing 44. For example, the suction port 76 is opposed to the blow port 72. That is, the collecting means 70 is located opposite to the air curtain blow mechanism 68 with respect to the laser beam L.

The suction line 78 is formed in the lowermost elongated plate 56 of the housing 44 and extends obliquely upward from the suction port 76 to communicate with the suction source 80. The suction source 80 is connected through the suction line 78 to the suction port 76 to suck the gas from the suction port 76. That is, the suction line 78 is provided downstream of the flow of the gas blown by the air curtain blow mechanism 68 to suck the gas and the debris generated near the work point K.

The suction line 78 of the collecting means 70 has one end connected to the suction source 80 and the other end opening to the upper surface (the front side WS) of the wafer W. In the second preferred embodiment shown in FIG. 4, cleaning liquid supplying means 82A for supplying a cleaning liquid to the suction line 78 is provided around the suction line 78. As shown in FIG. 4, the cleaning liquid supplying means 82A includes a plurality of cleaning liquid nozzles 84 opening to the suction line 78, a cleaning liquid source 88 for supplying a cleaning liquid to the cleaning liquid nozzles 84, and a cleaning liquid supply line 86 having one end connected to each cleaning liquid nozzle 84 and the other end connected to the cleaning liquid source 88.

The wafer W is a workpiece to be laser-processed by the laser processing apparatus 2. For example, the wafer W is a disk-shaped semiconductor wafer or optical device wafer formed from a substrate of silicon, sapphire, gallium nitride, or the like. As shown in FIG. 1, a plurality of devices are formed on the front side WS of the wafer W so as to be partitioned by a plurality of crossing streets. Further, the back side of the wafer W opposite to the front side WS is attached to the adhesive tape T, and the annular frame F is further attached to the adhesive tape T so as to surround the wafer W. Thus, the wafer W is supported through the adhesive tape T to the annular frame F in the condition where the front side WS is exposed. Further, a so-called Low-k film (not shown) formed of a Low-k material (mainly, porous material) as an interlayer dielectric material is formed on the front side WS of the wafer W.

The control means 12 functions to control the above-mentioned components of the laser processing apparatus 2. The control means 12 controls the laser processing apparatus 2 to perform the processing operation to the wafer W. In performing the processing operation to the wafer W, i.e., in applying the laser beam L from the laser beam applying means 6 to the front side WS of the wafer W, the control means 12 operates the gas source of the protection blow mechanism 46 to blow the gas from the blow ports 60, also operates the gas source of the air curtain blow mechanism 68 of the debris discharging means 10 to blow the gas from the blow port 72, and also operates the suction source 80 of the collecting means 70 to suck the gas from the suction port 76. Further, the control means 12 controls the cleaning liquid supplying means 82 or 82A with predetermined timing to supply a cleaning liquid to the suction line 78, thereby cleaning the suction line 78.

Figure 5:
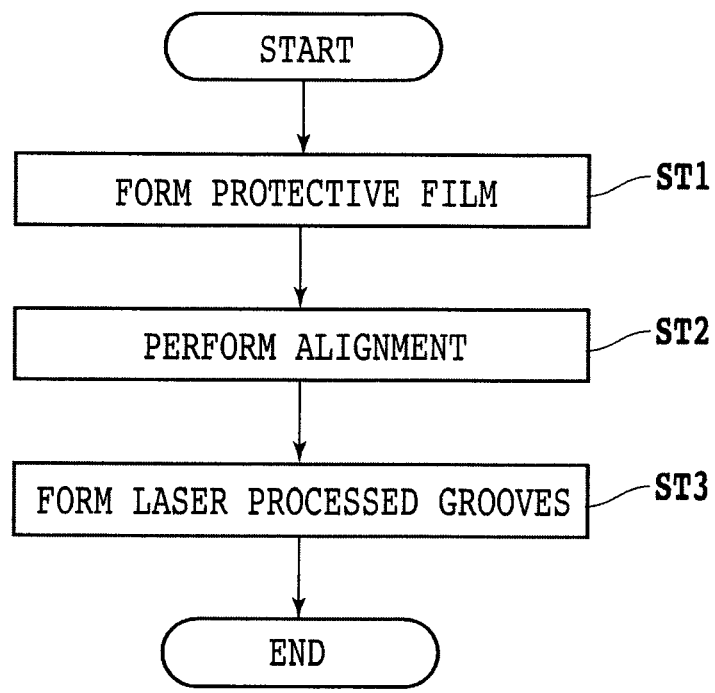
FIG. 5 is a flowchart showing a laser processing method using the laser processing apparatus.

There will now be described a laser processing method for processing the wafer W by using the laser processing apparatus 2. FIG. 5 is a flowchart showing the laser processing method using the laser processing apparatus 2. First, the adhesive tape T is attached to the back side of the wafer W opposite to the front side WS on which the devices are formed. Further, the annular frame F is attached to the adhesive tape T. The wafer W thus supported through the adhesive tape T to the annular frame F is stored into the cassette 14.

An operator inputs processing information into the control means 12. When the operator provides an instruction to start a processing operation, the laser processing apparatus 2 starts the processing operation. In this processing operation, the control means 12 performs step ST1 shown in FIG. 5. In step ST1, the wafer W before laser processing is taken out of the cassette 14 and carried to the temporary placing means 16 by the handling means 22. That is, the wafer W is temporarily placed on the pair of rails 24 of the temporary placing means 16. Thereafter, the wafer W is transferred to the spinner table 30 of the protective film forming and cleaning means 18 by the first transfer means 26. The wafer W is then held on the spinner table 30.

Thereafter, the spinner table 30 is lowered and next rotated about its axis. During the rotation of the spinner table 30, the liquid resin is sprayed from the coating nozzle to the wafer W held on the spinner table 30. As a result, the liquid resin is applied to the entire surface of the front side WS of the wafer W held on the spinner table 30 by a centrifugal force. After a predetermined time has elapsed, the rotation of the spinner table 30 is stopped and the application of the liquid resin from the coating nozzle is also stopped. When the liquid resin applied to the front side WS of the wafer W is cured, the protection film P formed of the liquid resin is formed on the front side WS of the wafer W.

In this manner, step ST1 is a protective film forming step of applying the liquid resin to the front side WS of the wafer W to thereby form the protective film P. After finishing the formation of the protective film P, the spinner table 30 is raised and the wafer W is next transferred from the spinner table 30 to the chuck table 4 by the second transfer means 28. Then, the wafer W is held on the chuck table 4 and the control means 12 performs step ST2.

In step ST2, the chuck table 4 is moved by the X-axis moving means and the Y-axis moving means to position the wafer W held on the chuck table 4 below the imaging means. At this position, the wafer W is imaged by the imaging means. An image obtained by the imaging means is output to the control means 12. The control means 12 then performs image processing such as pattern matching for making the alignment between a predetermined street of the wafer W held on the chuck table 4 and the focusing means 38 of the laser beam applying means 6 for applying the laser beam L, thus performing the alignment operation for aligning the focusing means 38 and the predetermined street in the X direction. After performing this alignment operation, the control means 12 performs step ST3.

In step ST3, the chuck table 4 is moved by the X-axis moving means and the Y-axis moving means according to the alignment information detected in step ST2. Further, the chuck table 4 is rotated about its axis by the base drive source to make the predetermined street parallel to the X direction (see FIG. 4). Thereafter, one end of the predetermined street is positioned directly below the focusing means 38 of the laser beam applying means 6, and the laser beam L is applied from the focusing means 38. At the same time, the chuck table 4 holding the wafer W thereon is moved in the X direction at a predetermined feed speed by the X-axis moving means. That is, the laser beam L is relatively moved on the front side WS of the wafer W in the direction shown by an arrow X1 (see FIG. 4).

As a result, the wafer W and the protective film P are partially ablated by the laser beam L along the predetermined street to thereby form the processed groove S as shown in FIG. 4. When the other end of the predetermined street reaches the position directly below the focusing means 38, the application of the laser beam L from the focusing means 38 is stopped and the movement of the chuck table 4 by the X-axis moving means is also stopped. Thereafter, the chuck table 4 is indexed in the Y direction by the Y-axis moving means to similarly apply the laser beam L along the next street, thereby forming a similar processed groove S along this street. This laser processing is performed similarly to all of the streets of the wafer W to form a plurality of similar processed grooves S along all of the streets.

In this manner, step ST3 is a processed groove forming step of applying the laser beam L from the protective film P side to the front side WS of the wafer W along the streets after performing step ST2, thereby forming the processed grooves S on the front side WS along the streets. Further, in step ST3 as the processed groove forming step, the gas is blown from the blow ports 60 connected to the gas source of the protection blow mechanism 46 of the protection blow means 8 during the application of the laser beam L. Accordingly, the pressure inside the housing 44 is kept at a positive pressure higher than the outside pressure.

Each blow port 60 extends slightly obliquely downward toward the inner surface of the housing 44, and the plural blow ports 60 are arranged at equal intervals around the transparent member 40. Accordingly, the gas blown from the plural blow ports 60 flows downward toward the lower opening 50 of the housing 44 uniformly around the transparent member 40. That is, a so-called downflow is generated in the housing 44 of the protection blow means 8 so as to flow downward toward the lower opening 50 uniformly around the transparent member 40.

Further, the conical portion 52 of the housing 44 is formed like a funnel having a diameter gradually decreasing toward the lower opening 50. Accordingly, the velocity of the downflow gradually increases toward the lower opening 50. As a result, it is possible to prevent the problem that an atmosphere containing the debris generated near the work point K by the laser processing may enter the housing 44 from the lower opening 50.

Further, in step ST3 as the processed groove forming step, while the gas is being blown from the blow ports 60 of the protection blow mechanism 46 of the protection blow means 8, the gas is blown from the blow port 72 of the air curtain blow mechanism 68 of the debris discharging means 10 and the gas is sucked from the suction port 76 connected to the suction source 80 of the collecting means 70. In this manner, the gas is blown from the blow port 72 of the air curtain blow mechanism 68 of the debris discharging means 10, so that the lower opening 50 of the housing 44 is covered with this gas blown from the blow port 72. In addition, an atmosphere containing the debris generated near the work point K is sucked from the suction port 76 through the suction line 78 to the suction source 80.

In the second preferred embodiment shown in FIG. 4, the control means 12 further controls the cleaning liquid supplying means 82A to supply the cleaning liquid to the suction line 78, thereby cleaning the suction line 78. The predetermined timing for cleaning of the suction line 78 is not especially limited. For example, after performing the ablation to the wafer W, the processing head 36 is preferably retracted from the wafer W and the cleaning liquid supplying means 82A is next operated to clean the suction line 78. As a modification, the cleaning liquid supplying means 82A may be always operated to clean the suction line 78 during the ablation of the wafer W.

In the second preferred embodiment shown in FIG. 4, the cleaning liquid supplying means 82A is composed of the cleaning liquid nozzles 84, the cleaning liquid supply line 86, and the cleaning liquid source 88. The cleaning liquid is supplied from the cleaning liquid source 88 to the cleaning liquid supply line 86 with the predetermined timing. The cleaning liquid supplied to the cleaning liquid supply line 86 is sprayed from the cleaning liquid nozzles 84, thereby cleaning the suction line 78.

In the first preferred embodiment shown in FIG. 1, the cleaning liquid supplying means 82 is composed of the cleaning liquid reservoir 34 and the cleaning liquid supply nozzle 35. The processing head 36 is immersed into the cleaning liquid reservoir 34 with predetermined timing. In the condition where the processing head 36 is immersed in the cleaning liquid reservoir 34, the suction source 80 is operated to supply (suck) the cleaning liquid from the cleaning liquid reservoir 34 to the suction line 78, thereby cleaning the suction line 78. Alternatively, the processing head 36 may be immersed into the cleaning liquid reservoir 34 during the operation of the suction source 80.

In the case that the cleaning liquid stored in the cleaning liquid reservoir 34 is insufficient in amount, the cleaning liquid is supplied from the cleaning liquid supply nozzle 35 into the cleaning liquid reservoir 34. The predetermined timing for cleaning in the first preferred embodiment is also not especially limited. For example, the cleaning may be performed at regular time intervals or at intervals of a fixed number of wafers. In the case that the cleaning liquid supplying means 82 is provided in the laser processing apparatus 2, the cleaning liquid supplying means 82A is not always necessary. Conversely, in the case that the cleaning liquid supplying means 82A is provided in the laser processing apparatus 2, the cleaning liquid supplying means 82 is not always necessary. That is, at least one of the cleaning liquid supplying means 82 and the cleaning liquid supplying means 82A is only necessary in the laser processing apparatus 2.

Further, the blow port 72 is located downstream of the suction port 76 in the direction of the arrow X1 as the direction of relatively moving the laser beam L on the front side WS of the wafer W during the laser processing in step ST3 as the processed groove forming step. Accordingly, the lower opening 50 is reliably covered with the gas blown from the blow port 72, so that it is possible to reliably prevent the problem that an atmosphere containing the debris generated near the work point K by the laser processing may enter the housing 44 from the lower opening 50.

After forming the processed grooves S on the front side WS of the wafer W along all of the streets, the chuck table 4 holding the wafer W is moved to the home position shown in FIG. 1 by the X-axis moving means. Thereafter, the wafer W is transferred from the chuck table 4 to the spinner table 30 of the protection film forming and cleaning means 18 by the second transfer means 28. In the condition where the wafer W is held on the spinner table 30, the spinner table 30 is lowered and next rotated about its axis. During the rotation of the spinner table 30, the cleaning liquid is sprayed from the cleaning nozzle onto the wafer W. Since the protective film P is formed of a water-soluble resin, the protective film P is removed (washed away) by the cleaning liquid and a centrifugal force from the front side WS of the wafer W together with the debris sticking to the wafer W during the laser processing.

After performing the removal of the protective film P, the rotation of the spinner table 30 about its axis is stopped and the supply of the cleaning liquid from the cleaning nozzle is also stopped. Thereafter, the spinner table 30 is raised and the wafer W is next transferred from the spinner table 30 to the temporary placing means 16 by the first transfer means 26. Thereafter, the wafer W is carried from the temporary placing means 16 into the cassette 14 on the cassette elevator 15 by the handling means 22.

According to the laser processing apparatus 2, a positive pressure can be kept in the housing 44 and a downflow can be generated in the housing 44 by the funnel-shaped conical portion 52 of the housing 44 and the protection blow mechanism 46, so that it is possible to prevent the entry of an atmosphere containing the debris into the housing 44 from the lower opening 50. Further, the suction line 78 can be cleaned by the cleaning liquid supplying means 82 or 82A. Accordingly, the focusing means 38 and the suction line 78 can be protected from the deposition of the debris, and it is possible to suppress the occurrence of fogging of the transparent member 40 due to the deposition of the debris in the atmosphere. Accordingly, the debris generated in performing the laser processing can be prevented from sticking to the optical components including the focusing means 38 and the transparent member 40 and also to the suction line 78.

While the laser processing is performed after forming the protective film P on the wafer W in each preferred embodiment, the present invention is not limited to this configuration, but the formation of the protective film P is not always necessary. Further, the protective film P is formed by applying the liquid resin including the water-soluble resin such as PVA, PEG, and PEO to the front side WS of the wafer W and next curing the liquid resin applied in each preferred embodiment. However, the liquid resin applied may be not completely cured (dried) to form the protective film P, but ablation may be performed to this protective film P in the uncompletely dry condition. In this case, a large amount of debris may be generated from this protective film P in the uncompletely dry condition. However, the entry of the debris into the housing 44 can be prevented by the protection blow means 8, thereby preventing the fogging of the transparent member 40.

The configurations of the X-axis moving means, the Y-axis moving means, and the Z-axis moving means may be suitably modified in the present invention. Further, the cleaning liquid reservoir 34 may be provided with Z-axis moving means so as to be movable in the Z direction. The present invention is not limited by the contents described above in each preferred embodiment. Further, the components described above may include those easily assumable by persons skilled in the art and also include substantially the same parts as those known in the art. Further, the configurations described above may be suitably combined. Further, various omissions, replacements, and changes in configuration may be made without departing from the scope of the present invention.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser processing apparatus comprising:

holding means for holding a workpiece; and laser beam applying means for performing ablation to said workpiece held by said holding means, said laser beam applying means including laser beam oscillating means for oscillating a laser beam and a processing head for applying said laser beam oscillated by said laser beam oscillating means to said workpiece;

said processing head including a focusing lens for focusing said laser beam oscillated by said laser beam oscillating means and collecting means provided between said focusing lens and said workpiece for collecting debris generated by the application of said laser beam focused by said focusing lens to said workpiece;

said collecting means including a suction source for sucking said debris and a suction line having one end connected to said suction source and the other end opening to the front side of said workpiece;

said laser processing apparatus further including a cleaning liquid supplying means for supplying a cleaning liquid to said suction line, wherein said cleaning liquid supplying means includes a cleaning liquid nozzle opening within said suction line, a cleaning liquid source for supplying said cleaning liquid to said cleaning liquid nozzle, and a cleaning liquid supply line having one end connected to said cleaning liquid nozzle and the other end connected to said cleaning liquid source;

wherein said cleaning liquid supply means further includes a cleaning liquid reservoir for storing additional cleaning liquid, said suction line being cleaned by moving said processing head to said liquid reservoir and immersing said processing head into said cleaning liquid reservoir with predetermined timing and operating said suction source in the condition where said processing head is immersed in said cleaning liquid reservoir.

* * * * *